US010687233B2

(12) United States Patent
Simsek

(10) Patent No.: US 10,687,233 B2
(45) Date of Patent: Jun. 16, 2020

(54) VEHICLE, DEVICES, METHOD AND COMPUTER PROGRAMS FOR MONITORING DATA TRAFFIC AND A DATA TRANSMISSION TO VEHICLE COMPONENT

(71) Applicant: VOLKSWAGEN AG, Wolfsburg (DE)

(72) Inventor: Burak Simsek, Braunschweig (DE)

(73) Assignee: Volkswagen AG (DE)

( * ) Notice: Subject to any disclaimer, the term of this patent is extended or adjusted under 35 U.S.C. 154(b) by 196 days.

(21) Appl. No.: 15/327,093

(22) PCT Filed: Apr. 4, 2016

(86) PCT No.: PCT/EP2016/057363
§ 371 (c)(1),
(2) Date: Jan. 18, 2017

(87) PCT Pub. No.: WO2016/177521
PCT Pub. Date: Nov. 10, 2016

(65) Prior Publication Data
US 2018/0213420 A1    Jul. 26, 2018

(30) Foreign Application Priority Data
May 5, 2015 (DE) .................. 10 2015 208 242

(51) Int. Cl.
*H04W 24/08* (2009.01)
*H04W 4/14* (2009.01)
(Continued)

(52) U.S. Cl.
CPC ............ *H04W 24/08* (2013.01); *G08C 17/00* (2013.01); *H04L 67/12* (2013.01); *H04W 4/14* (2013.01);
(Continued)

(58) Field of Classification Search
None
See application file for complete search history.

(56) References Cited

U.S. PATENT DOCUMENTS 8,989,954 B1 *  3/2015  Addepalli ............. H04W 4/046
701/32.3
2008/0101278 A1  5/2008  Bengtsson et al.
(Continued)

FOREIGN PATENT DOCUMENTS

DE    102005027018 A1    11/2006
DE    102011055821 A1    6/2012
(Continued)

OTHER PUBLICATIONS

Search Report for German Patent Application No. 10 2015 208 242.3; dated Feb. 29, 2016.
(Continued)

*Primary Examiner* — Phirin Sam
*Assistant Examiner* — Sori A Aga
(74) *Attorney, Agent, or Firm* — Barnes & Thornburg LLP

(57) ABSTRACT

A vehicle device for monitoring data traffic with components of a motor vehicle in a motor vehicle includes one or more interfaces to communicate with at least one transceiver of a first radio system and at least one transceiver of a second radio system. The device includes a monitoring module to receive information about a data transmission via the one or more interfaces and the first radio system and to transmit data via the one or more transceivers and via the second radio system. The network device for a network component for monitoring a data transmission to at least one component of a motor vehicle includes at least one interface to communicate with at least one other network component and a monitoring module to receive information about a request
(Continued)

for a data transmission and to transmit information about the request via a radio system to the motor vehicle.

22 Claims, 4 Drawing Sheets

(51) Int. Cl.
  H04W 88/06 (2009.01)
  G08C 17/00 (2006.01)
  H04W 68/12 (2009.01)
  H04W 48/18 (2009.01)
  H04L 29/08 (2006.01)
  H04W 4/44 (2018.01)
  H04W 76/15 (2018.01)
  H04W 4/80 (2018.01)
  H04W 24/04 (2009.01)
(52) U.S. Cl.
  CPC ........... *H04W 48/18* (2013.01); *H04W 68/12* (2013.01); *H04W 88/06* (2013.01); *H04L 67/125* (2013.01); *H04W 4/44* (2018.02); *H04W 4/80* (2018.02); *H04W 24/04* (2013.01); *H04W 76/15* (2018.02)

(56) References Cited

U.S. PATENT DOCUMENTS

| 2008/0268838 | A1 | 10/2008 | Zufall et al. |
| 2009/0227272 | A1 | 9/2009 | Danzeisen et al. |
| 2013/0076493 | A1 | 3/2013 | Christensen et al. |
| 2013/0189969 | A1* | 7/2013 | Periyalwar ............ H04W 88/06 455/418 |
| 2014/0185457 | A1 | 7/2014 | Barnes et al. |
| 2014/0236333 | A1 | 8/2014 | Perkuhn et al. |
| 2015/0347121 | A1* | 12/2015 | Harumoto ............ G01C 21/32 717/172 |

FOREIGN PATENT DOCUMENTS

| DE | 102012105227 A1 | 12/2013 |
| DE | 102013222332 A1 | 5/2014 |
| DE | 102012023109 A1 | 6/2014 |

OTHER PUBLICATIONS

Search Report for International Patent Application No. PCT/EP2016/057363; dated Jul. 4, 2016.

* cited by examiner

VEHICLE, DEVICES, METHOD AND COMPUTER PROGRAMS FOR MONITORING DATA TRAFFIC AND A DATA TRANSMISSION TO VEHICLE COMPONENT

PRIORITY CLAIM

This patent application is a U.S. National Phase of International Patent Application No. PCT/EP2016/057363, filed 4 Apr. 2016, which claims priority to German Patent Application No. 10 2015 208 242.3, filed 5 May 2015, the disclosures of which are incorporated herein by reference in their entirety.

SUMMARY

Exemplary embodiments relate to a device for monitoring data traffic with components of a motor vehicle, a motor vehicle, a device for a network component for monitoring a data transmission to at least one component of a motor vehicle, a method for monitoring data traffic with components of a motor vehicle, a method for a network component for monitoring a data transmission to at least one component of a motor vehicle, and a computer program including program code.

BRIEF DESCRIPTION OF THE DRAWINGS

Disclosed embodiments are described in greater detail below with reference to the drawings, but are generally not altogether limited to these exemplary embodiments. The following are shown.

DETAILED DESCRIPTION OF THE DISCLOSED EMBODIMENTS

Figure 1:
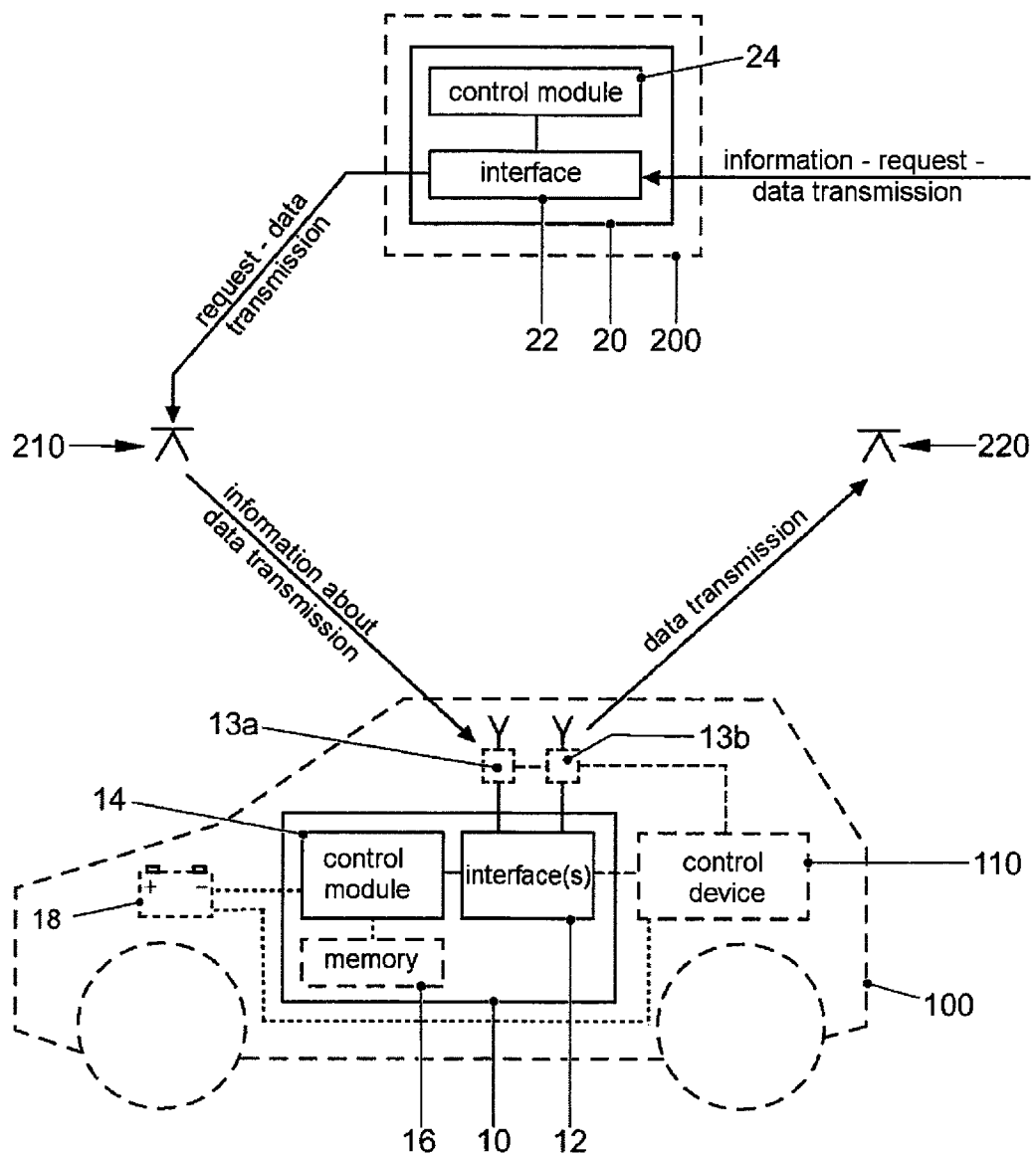
FIG. 1 shows a block diagram of an exemplary embodiment of a device for monitoring data traffic with components of a motor vehicle, a block diagram of an exemplary embodiment of a device for a network component, and a block diagram of an exemplary embodiment of a vehicle.

Digital data and media are becoming more and more important. Digital data are also making inroads into an ever-increasing number of areas in the motor vehicle field; for controlling vehicle components, for example, engine control; for navigation, for example, maps and their updates; for safety, for example, traffic information and wear detection; as well as in the entertainment sector, for example, media data such as audio and video data. Depending on the use of the data, large quantities of data may also be transmitted, for example, for program updates, map updates, subscribing to media services, etc. At the same time, the variety of data services available is increasing; for example, various mobile communication services and interfaces are now available, via which digital data may be transmitted. The various transmission options provide different characteristics, which differ with respect to availability, transmission rate, cost, and access technology.

Some additional examples may be found in the following documents:

US2014/0236333 A1, in which a method for receiving media data is described; US2014/0185457 A1, which discloses a signaling mechanism; and DE 10 2011 055 821 A1, which describes a method for temporarily storing media content in a network.

The requirement therefore exists to provide an improved concept for monitoring a data transmission and for monitoring data traffic with a vehicle.

This requirement is addressed via a device for monitoring data traffic with components of a motor vehicle as claimed in claim 1, a motor vehicle as claimed in claim 13, a device for a network component for monitoring a data transmission to at least one component of a motor vehicle as claimed in claim 14, a method for monitoring data traffic with components of a motor vehicle as claimed in claim 18, a method for a network component for monitoring a data transmission to at least one component of a motor vehicle as claimed in claim 19, and a computer program including program code as claimed in claim 20.

Exemplary embodiments are based on the finding that different wireless systems are available having different availabilities or different levels of coverage. Some radio systems provide larger coverage areas, so that they are suitable for transmitting a piece of information about data to be transmitted. Other radio systems, which, for example, have shorter ranges or degrees of coverage, are often more suitable for transmitting larger quantities of data; for example, since they have larger capacities or bandwidths, the use of these systems is often more economical. Exemplary embodiments therefore use a first radio system to notify components of a motor vehicle of a desired transmission, and another radio system to carry out the actual data transmission.

Exemplary embodiments provide a device for monitoring data traffic with components of a motor vehicle in a motor vehicle, which is also referred to hereinafter as a vehicle device. The vehicle device includes one or multiple interfaces which are designed to communicate with at least one transceiver of a first radio system and with at least one transceiver of a second radio system. The device furthermore includes a control module which is designed to receive a piece of information about the data transmission via the one or multiple interfaces and the first radio system, and to initiate the data transmission via the one or multiple transceivers and via the second radio system.

In addition, exemplary embodiments provide a vehicle including an exemplary embodiment of such a device. Furthermore, exemplary embodiments provide a device for a network component for monitoring a data transmission to at least one component of a motor vehicle, which is also referred to below as a network device. This device includes at least one interface which is designed to communicate with at least one other network component, and a control module which is designed to obtain information about a request for a data transmission to the motor vehicle via at least one interface, and to transmit a transmission of a piece of information about the request to the motor vehicle via a radio system, via the at least one interface.

Exemplary embodiments may thus provide a concept for more effective data transmission to a motor vehicle. One requirement for such a data transmission may, for example, be initiated via a network component, for example, updating media data or control data in a vehicle. The network component may then be accessible via conventional mechanisms, for example, by a user of the motor vehicle, a manufacturer of the motor vehicle, or a component manufacturer of the motor vehicle. This requirement may then be transmitted to the motor vehicle via a first radio system. On occasion, a connection may optionally be established from the motor vehicle to a second radio system and the data may be transmitted.

In some exemplary embodiments of the vehicle device, the one or multiple interfaces may furthermore be designed to communicate with a control device of the motor vehicle, wherein the control module is designed to transmit transmitted data to the control device of the vehicle. In this respect, the vehicle device may enable coordination with a control device, for example, with a controller a media device (for example, display unit, on-board computer, etc.) of the vehicle. Thus, for example, connection of other vehicle components may be effected if the data transmission takes place.

In additional exemplary embodiments, in a switched-off state of the motor vehicle, the control module of the vehicle device may be designed to put the transceivers into a ready-to-receive state with respect to the first radio system, and to put them into a quiescent mode or a switched-off state with respect to the second radio system, via the one or multiple interfaces. Some exemplary embodiments may thus enable energy conservation in the case of simultaneous accessibility; for example, energy consumption may be reduced in the case of simultaneous readiness to receive. The transceiver of the second radio system, for example, having a higher transmission rate and a higher energy consumption, may then be connectable as needed and/or as available.

In some exemplary embodiments, the control module may furthermore be designed to monitor a charge state of the energy store in the switched-off state of the motor vehicle, and to put the transceivers into a ready-to-receive state with respect to the first, second, or both radio systems via the one or multiple interfaces, if a minimum charge is present in the energy store. In this respect, in some exemplary embodiments, monitoring, for example, of a battery of the vehicle, may take place, and the data transmission and/or optionally the readiness to receive of the transceivers may be made a function of a charge state of the battery. If, for example, a predefined minimum charging state of the battery is not available, the data transmission may therefore be omitted, or the readiness to receive with respect to the information about the data transmission may also be prevented, not to further degrade the charging state of the battery. Any possible data transmission attempts or wake-up processes for the data transmission may then take place if the charge state of the energy store is above a certain threshold.

For example, in some exemplary embodiments, the control module may be designed to receive the information about the data transmission such as a short message (SMS, Short Message Service) via the first radio system. In an analogous manner, the control module of the network device may be designed to transmit the information about the request for the data transmission such as a short message via the first radio system. In this respect, the transmission of the information may be carried out economically and having extensive coverage. The first radio system may, for example, correspond to a Global System for Mobile Communication (GSM), a second-generation mobile radio standard. The second radio system may, for example, correspond to a Wireless Local Area Network (WLAN), a standard in accordance with IEEE 802.11, which was developed for short-range connection primarily in home networks. In this respect, for example, a data transmission in a WLAN network may be initiated by an SMS. Exemplary embodiments may, for example, provide automated logging onto, or switching on of, a WLAN transceiver only after obtaining such an SMS.

In other exemplary embodiments, the data transmission may include a transmission of update data for a component of the vehicle, for example, program, software, or firmware updates; media data for a media playback system of the motor vehicle, for example, audio, video, or control data of a manufacturer of the motor vehicle or of a manufacturer of motor vehicle components. In this respect, for example, subscribed media services of a user may be updated via WLAN, for example, overnight in the local parking area. The at least one interface of the network device may then be designed to obtain the information about the request from a user of the motor vehicle, from a component manufacturer of the motor vehicle, or from a manufacturer of the motor vehicle.

After obtaining the information about the data transmission (for example, via SMS), the control module of the vehicle device may be designed to put the transceiver for the second radio system (for example, WLAN) into a ready-to-receive state via the one or multiple interfaces, to check whether data transmission services are available via the second radio system (for example, WLAN), and to initiate the data transmission if data transmission services are available via the second radio system. In this respect, exemplary embodiments may allow the transmission of data in an economical manner. If data transmission services are not available via the second radio system, and at least if the motor vehicle is in the switched-off state, the control module of the vehicle device may furthermore be designed to put the transceiver for the second radio system again into the quiescent mode or the switched-off state via the one or multiple interfaces, and to check again on an availability of a data transmission in the second radio system at a later point in time, to initiate the data transmission if data transmission services are available via the second radio system. For data transmissions which have a certain delay tolerance, exemplary embodiments may thus provide the option of waiting for an expedient opportunity for transmission.

For example, the control module may be designed to choose the later point in time based on a predefined period of time; for example, a periodic availability test may thus take place. In some exemplary embodiments, the control module may be designed to choose the later point in time based on a piece of availability information. For example, this information may specify a location or a time at which a probability of availability of the second radio system is above a certain threshold. For example, the vehicle device may furthermore include a memory module, wherein the control module is designed to store information about a temporal and/or local availability of the data transmission in the second radio system as availability information, via the memory module. In this respect, exemplary embodiments may also enable a certain ability to learn about the availability of the second radio system, so that the information about the second point in time may be determined from an availability history.

In other exemplary embodiments, the control module may be designed to transmit information with respect to the status of the data transmission to a network component, via the first or the second radio system. In such an exemplary embodiment, status information may be communicated, for example, via one of the radio systems, as to whether a piece of information about a data transmission was received; which radio systems are available, in particular, whether the second radio system is available; whether the data transmission was completed; whether an attempt for data transmission has failed, for example, due to a lack of availability of the second radio system; or whether a data transmission attempt is repeated; etc. Exemplary embodiments may thus enable checking or monitoring of the data transmission by the network component.

Exemplary embodiments furthermore provide a method for monitoring data traffic with components of a motor vehicle in a motor vehicle. The method comprises communicating with at least one transceiver of a first radio system and communicating with at least one transceiver of a second radio system. The method furthermore comprises receiving a piece of information about a data transmission via the first radio system and initiating the data transmission via the second radio system.

In addition, exemplary embodiments provide a method for a network component for monitoring a data transmission to at least one component of a motor vehicle. The method comprises communicating with another network component and obtaining information about a request for a data transmission to a motor vehicle. The method furthermore comprises transmitting a piece of information about the request to the motor vehicle, via a radio system.

Exemplary embodiments furthermore provide a computer program including program code for carrying out the method if the program code is executed on a computer, a processor, a controller, or a programmable hardware component. Exemplary embodiments also provide a digital storage medium which is machine-readable or computer-readable and which has electronically readable control signals which are able to interact with a programmable hardware component in such a way that one of the above-described methods is executed.

Various exemplary embodiments will now be described in greater detail with reference to the attached drawings, in which several exemplary embodiments are depicted. In the figures, the thickness dimensions of lines, layers, and/or regions may be depicted in an exaggerated manner for the sake of clarity.

In the following description of the attached figures, which merely depict several exemplary embodiments, identical reference numerals may denote identical or comparable components. Furthermore, summary reference numerals for components and objects may be used, which appear multiple times in at least one exemplary embodiment or in one drawing, but which are described jointly with respect to one or multiple features. Components or objects which are described having identical or summary reference numerals may be designed identically, but also differently as appropriate, with respect to individual features, multiple features, or all features, for example, their dimensions, unless otherwise evident explicitly or implicitly from the description.

Although exemplary embodiments may be modified and altered in different ways, exemplary embodiments are illustrated as examples in the figures and will be described herein in detail. However, it should be clarified that there is no intention to limit exemplary embodiments to the respective disclosed forms; but rather, exemplary embodiments are to cover all functional and/or structural modifications, equivalents, and alternatives which lie within the scope of the disclosed embodiments. Identical reference numerals denote identical or similar elements throughout the description of the figures.

It is to be noted that an element which is described as being "connected to" or "linked with" another element may be directly connected to or linked with the other element, or that interjacent elements may be present. On the other hand, if an element is described as being "directly connected to" or "directly linked with" another element, no interjacent elements are present. Other terms which are used to describe the relationship between elements should be interpreted in a similar manner (for example, "between" versus "directly between", "adjacent" versus "directly adjacent", etc.).

The terminology which is used herein serves only to describe particular exemplary embodiments and is not intended to limit the exemplary embodiments. As used herein, the singular forms "a", "an", and "the" may also include the plural forms as long as the context does not expressly specify otherwise. Furthermore, it is to be understood that the terms such as "contains", "containing", "has", "comprises", comprising", and/or "having", when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as ascribed to them by persons having ordinary skill in the art, in the field to which these exemplary embodiments belong. It is to be understood that expressions such as those defined in commonly used dictionaries are to be interpreted as having the meaning which is consistent with their meaning in the context of the relevant technology, and are not to be interpreted in an idealized or overly formal sense unless otherwise expressly defined herein.

Vehicles now include a plurality of communications interfaces and methods which may be both wired and wireless. Typical available wireless networks use radio networks having different mobile radio standards, which may be configured in a cellular manner. Home networks and applications in which a limited coverage area of the wireless services is deemed to be sufficient also use radio networks which are implemented according to the standards for home networks. Vehicles which use WLAN may encounter problems due to the energy consumption of the WLAN transceiver, which would discharge the battery if used for a longer period of time while the vehicle is switched off. In this respect, a use of WLAN for update purposes could be considered to be critical. By switching on the WLAN as second radio system, wherein a data transmission was previously indicated via a first radio system, at least some exemplary embodiments may minimize this problem. In this respect, exemplary embodiments may provide a battery-conserving concept for using WLAN for data transmission to motor vehicles.

FIG. 1 shows a block diagram of an exemplary embodiment of a device 10 for monitoring data traffic with components of a motor vehicle 100. Optional components are depicted in the following figures with dashed lines. Here and below, "motor vehicle" is in principle to be understood to mean any vehicle, for example, a bus, a truck, an automobile, a two-wheeled vehicle, an aircraft, a ground vehicle, a watercraft, etc., since exemplary embodiments may in principle be used in any motor vehicles. The vehicle device 10 includes one or multiple interfaces 12 which are designed to communicate with at least one transceiver 13a of a first radio system 210, and with at least one transceiver 13b of a second radio system 220.

The at least one interface 12 may, for example, correspond to one or multiple inputs and/or to one or multiple outputs for receiving and/or transmitting information, for example, in digital bit values, based on a code or protocol, within a module, between modules, or between modules of different entities. In this respect, the one or multiple interfaces 12 may correspond to wireless or wired interfaces which are suitable for transmitting a corresponding piece of information or corresponding information, optionally using corresponding protocols, for example, the Internet Protocol (IP), the Ethernet protocol, the Controller Area Network (CAN) protocol, etc.

In the exemplary embodiment depicted in FIG. 1, the transceivers 13a and 13b are depicted as physically separate receivers. In some exemplary embodiments, they may also have shared components. In addition, in some exemplary embodiments, one or both transceivers may be integrated into the device.

Exemplary embodiments may therefore make use of a transceiver/mobile radio device which is designed for the communication of data, via a mobile radio system, with a server or computer or another communication partner which, for example, is accessible via the Internet or the World Wide Web (WWW) or another network. The mobile radio system may, for example, correspond to one of the mobile radio systems which are standardized by corresponding standardization bodies, for example, the 3rd Generation Partnership Project (3GPP) group. For example, they include the Global System for Mobile Communications (GSM), Enhanced Data Rates for GSM Evolution (EDGE), GSM EDGE Radio Access Network (GERAN); the Universal Terrestrial Radio Access Network (UTRAN) or the Evolved UTRAN (E-UTRAN), for example, the Universal Mobile Telecommunication System (UMTS); Long Term Evolution (LTE) or LTE-Advanced (LTE-A); or mobile radio systems of other standards, for example, the Worldwide Interoperability for Microwave Access (WIMAX), IEEE802.16 or Wireless Local Area Network (WLAN), IEEE802.11; and generally, a system which is based on a time division multiple access (TDMA) method, a frequency division multiple access (FDMA) method, a code division multiple access (CDMA) method, an orthogonal frequency division multiple access (OFDMA) method, or another technology or multiple access method. The terms mobile radio system, mobile radio network, mobile communication system, radio system, radio network, and mobile radio network are used synonymously below.

The radio system 210, 220 furthermore includes at least one fixed base station transceiver. It is assumed below that such a mobile radio system includes at least one stationary transceiver in the sense of a fixed base station, which has a connection to the wired portion of the mobile radio network. On the other side, it is assumed that the mobile radio network includes at least one mobile transceiver 13a, 13b (mobile radio terminal), wherein here, the term "mobile" is to refer to the fact that communication by means of this transceiver is carried out via the air interface, i.e., in a cable-free/wireless manner. Such a mobile transceiver may, for example, correspond to a portable telephone, a smartphone, a tablet computer, a portable computer, or a radio module which is not necessarily mobile in the sense that it actually moves with respect to its surroundings. The transceiver may also be stationary (for example, relative to a motor vehicle), but may communicate with the mobile radio network wirelessly. In this respect, the aforementioned base station may correspond to one of the aforementioned standards, for example, a NodeB, an eNodeB, a base transceiver station (BTS), etc.

A base station transceiver or a base station (these terms may be used equivalently) may be designed to communicate with one or multiple active mobile radio devices (transceivers 13a, 13b), and to communicate within or adjacent to a service area or coverage area of another base station transceiver or a base station, for example, as a macrocell base station or as a small-cell base station. Thus, disclosed embodiments may include a mobile communication system with one or multiple mobile radio terminals and one or multiple base stations, wherein the base station transceivers may provide macrocells or small cells, for example, picocells, metrocells, or femtocells. A mobile transceiver 13a, 13b or mobile radio terminal may correspond to a smartphone (intelligent telephone), a cell phone, a user device, a radio device, a mobile, a mobile station, a laptop, a notebook, a personal computer (PC), a personal digital assistant (PDA), a universal serial bus (USB) stick or adapter, an automobile, etc. A mobile transceiver may also be referred to as user equipment (UE) or a mobile, in accordance with the 3GPP terminology.

A base station transceiver or a base station of a radio system 210, 220 may be located in a stationary or at least fixed portion of the network or system, at least from the point of view of a mobile radio terminal. A base station transceiver or a base station may also correspond to a remote radio head, a relay station, a transmission point, an access point, a radio device, a macrocell, a small cell, a microcell, a femtocell, a metrocell, etc. A base station or a base station transceiver is thus understood to be a logical concept for a node/unit for providing a radio carrier or radio links via the air interface, via which access to a mobile radio network is provided to a terminal/mobile transceiver.

A base station or a base station transceiver may constitute a wireless interface for mobile radio terminals to a wired network. The radio signals used may be radio signals standardized by 3GPP, or generally radio signals in accordance with one or more of the aforementioned systems. Thus, a base station or a base station transceiver may correspond to a NodeB, an eNodeB, a base transceiver station (BTS), an access point, a remote radio head, a transmission point, a relay station, etc., which may be subdivided into further functional units.

A mobile radio terminal or mobile transceiver 13a, 13b may be associated with a base station or cell or registered with it. The term "cell" relates to a coverage area of the radio services which are provided by a base station, for example, by a NodeB (NB), an eNodeB (eNB), a remote radio head, a transmission point, a relay station, etc. A base station may provide one or multiple cells at one or multiple carrier frequencies. In some disclosed embodiments, a cell may also correspond to a sector. For example, sectors may be formed with sector antennas which are designed for covering an angular section around an antenna location. In some disclosed embodiments, a base station may, for example, be designed for operating three or six cells or sectors (for example, 120° in the case of three cells and 60° in the case of six cells). A base station may include multiple sector antennas. The terms "cell" and "base station" may also be used synonymously below. In addition, a distinction is made between fixed and mobile base stations, wherein base stations may also function as mobile relay stations.

In other words, in the disclosed embodiments, the mobile communication system may also comprise a heterogeneous cell network (HetNet) which includes different cell types, for example, cells with closed subscriber groups (CSGs); cells which provide a home network (HeNodeB), which can provide open or closed subscriber groups; and open cells such as cells of different sizes, for example, macrocells and small cells, wherein the coverage area of a small cell is smaller than the coverage area of a macrocell. A small cell may correspond to a metrocell, a microcell, a picocell, a femtocell, etc. The coverage areas of the individual cells are provided by the base stations for their service areas, and are a function of the transmission power of the base stations and the interference conditions in the respective area. In some disclosed embodiments, the coverage area of a small cell may be at least partially surrounded by a service area of a different cell or partially coincide with or overlap with the service area, for example, of a macrocell. Small cells may be used to extend the capacity of the network. A metrocell may therefore be used to cover a smaller area than a macrocell; for example, metrocells are used to cover a street or a section within a conurbation. The coverage area of a macrocell may have a diameter on the order of one kilometer or more; the coverage area of a microcell may have a diameter of less than one kilometer; and a picocell may have a coverage area with a diameter of less than 100 m. A femtocell may have the smallest coverage area, and it may be used, for example, to cover a household area, a motor vehicle interior area, or a gate area at the airport; i.e., its transmission area may have a diameter of less than 50 m. The first radio system 210 and the second radio system 220 are each depicted in FIG. 1 by a base station.

As FIG. 1 also shows, the vehicle device 10 furthermore includes a control module 14 which is coupled with one or multiple interfaces 12. The control module 14 is furthermore designed to receive a piece of information about a data transmission via the one or multiple interfaces 12 and the first radio system 210, and to initiate the data transmission via the one or multiple interfaces 12 and via the second radio system 220.

In exemplary embodiments, the control module 14 may correspond to any controller or processor, or to a programmable hardware component. For example, the control module 14 may also be implemented as software which is programmed for a corresponding hardware component. In this respect, the control module 14 may be implemented as programmable hardware with correspondingly adapted software. In this case, any processors, such as digital signal processors (DSPs), may be used. Exemplary embodiments are not limited to a certain type of processor.

Any processors, or even multiple processors, are conceivable for implementing the control module 14. In some exemplary embodiments, the information about the data transmission may be made up of one or multiple bits which simply indicate that a data transmission is to take place. In principle, all additional information, for example, which data and where they are located, etc., may also be provided only after the establishment of a connection via the second radio system 220, for example, with a certain server. In some exemplary embodiments, such information may also be provided together with the information about the data transmission via the first radio system 210.

FIG. 1 furthermore shows a block diagram of an exemplary embodiment of a device 20 for a network component 200. The network component 200 may in principle correspond to a computer, a server, etc., which is arranged in the network and which, for example, is accessible via the Internet or WWW. The device 20 is designed for monitoring a data transmission to at least one component of the motor vehicle 100. The device 20 includes at least one interface 22 which is designed to communicate with at least one other network component. Similarly to the above-described interface 12, the interface 22 may also be designed to communicate with any other network components, such as other servers, computers, routers, etc. Such communication may take place directly and indirectly, i.e., via one or multiple intermediate components. The interface 22 may, for example, correspond to one or multiple inputs and/or one or multiple outputs for receiving and/or transmitting information, for example, in digital bit values, based on a code or protocol, within a module, between modules, or between modules of different entities. In this respect, the at least one interface 22 may correspond to a wireless or wired interface which is suitable for transmitting a corresponding piece of information or corresponding information, optionally using corresponding protocols, for example, the Internet Protocol (IP), the Ethernet protocol, etc.

The device furthermore includes a control module 24 which is designed to obtain information about a request for a data transmission to the motor vehicle 100 via the at least one interface 22, and to transmit a transmission of a piece of information about the request to the motor vehicle 100 via the radio system 210, via the at least one interface 22. In this respect, in the exemplary embodiment depicted in FIG. 1, the information, for example, one or multiple bits, may be transmitted via the radio system 210 to the vehicle device 10, which then optionally initiates the actual data transmission via the second radio system 220.

In exemplary embodiments, the control module 24 may correspond to any controller or processor or a programmable hardware component. For example, the control module 24 may also be implemented as software which is programmed for a corresponding hardware component. In this respect, the control module 24 may be implemented as programmable hardware having correspondingly adapted software. In this case, any processors, such as digital signal processors (DSPs), may be used. Exemplary embodiments are not limited to a certain type of processor. Any processors, or even multiple processors, are conceivable for implementing the control module 24.

FIG. 1 illustrates another exemplary embodiment with dashed lines, wherein the one or multiple interfaces 12 of the vehicle device 10 are furthermore designed to communicate with a control device 110 of the motor vehicle 100, wherein the control module 14 is designed to transmit transmitted data to the control device 110 of the vehicle. The control device 110 of the vehicle 100 may be implemented according to one of the above-described control modules 14, 24, for example, in software on a processor. Control information, for example, activation signals, may also be exchanged or communicated between the control module 14 and the control device 110. In some exemplary embodiments, the vehicle already includes, for example, one of the transceivers 13a, 13b, and the control module 14 provides corresponding monitoring and/or control signals. In this respect, the direct connections between the interfaces 12 and the transceivers 13a, 13b depicted in FIG. 1 may also run indirectly (see dashed path) via the control device 110 of the vehicle.

In an additional exemplary embodiment, in a switched-off state of the motor vehicle 100, the control module 14 is designed to put the transceivers 13a, 13b into a ready-to-receive state with respect to the first radio system 210 via the one or multiple interfaces 12, and to put them into a quiescent mode or a switched-off mode with respect to the second radio system 220. In this respect, the motor vehicle may remain accessible via the first radio system 210, while energy may be conserved with respect to the second radio system 220, until a data transmission is actually pending.

FIG. 1 furthermore illustrates an energy store 18 of the vehicle 100 (optional in exemplary embodiments, depicted with dashed lines). In some exemplary embodiments, the control module 14 is designed to monitor a charge state of the energy store 18 in the switched-off state of the motor vehicle 100 and to put the transceivers 13a, 13b into a ready-to-receive state with respect to the first or second or both radio systems 210, 220 via the one or multiple interfaces 12, if a minimum charge is present in the energy store 18. The energy store 18 is implemented in FIG. 1 as a battery or a vehicle battery. As the dashed connections in FIG. 1 indicate, monitoring of the charge state of the battery (energy store 18) may take place directly via the control module 14 or also indirectly via the control device 110 of the vehicle 100. In some exemplary embodiments, monitoring of the battery of the vehicle therefore takes place. Switching on or waking up the transceivers 13a, 13b then takes place as a function of the charge state of the battery, for example, by means of a threshold value decision or the minimum charge state.

The data transmission and/or optionally the readiness to receive of the transceivers 13a, 13b is/are then made a function of a charge state of the battery. In this respect, in the case of a low charge state of the battery, the data transmission may be omitted, or the readiness to receive with respect to the information about the data transmission may also be prevented not to further degrade the charge state of the battery. Any possible data transmission attempts or wake-up processes for the data transmission may then take place if the charge state of the energy store is above a certain threshold. Waking up is then to take place only if enough energy is available.

In a further exemplary embodiment, the control module 14 of the vehicle device 10 is designed to receive the information about the data transmission for example, a short message via the first radio system 210. In exemplary embodiments, for any other radio systems 210 and/or protocols for transmitting the information about the data transmission are also generally conceivable. The control module 24 of the network device 20 is then designed to transmit the information about the request for the data transmission correspondingly such as a short message via the first radio system 210, as indicated by the dashed arrow in FIG. 1. The first radio system 210 may, for example, correspond to a GSM system or another of the aforementioned systems. The second radio system 220 may, for example, correspond to a WLAN system; however, it is also conceivable that it is a home network cell (HeNodeB) of another mobile radio standard. In this respect, in some exemplary embodiments, a data transmission via WLAN may be triggered via SMS. For example, the vehicle may access certain predefined or known WLAN or other networks, for example, a home network or company network.

In exemplary embodiments, the data transmission may, for example, include a transmission of update data for a component of the vehicle 100, media data for a media playback system of the motor vehicle 100, or control data of a manufacturer of the motor vehicle 100 or a manufacturer of motor vehicle components. For example, software or firmware updates may be provided by the manufacturer of the vehicle 100 or by vehicle components, via which the vehicle is then informed via SMS. The at least one interface 22 of the network device 20 may then be designed to obtain the information about the request from a user of the motor vehicle 100 (for example, via a program which runs on a PC, laptop, tablet, or smartphone), from a component manufacturer of the motor vehicle 100, or from a manufacturer of the motor vehicle 100.

In an additional exemplary embodiment, the control module 14 of the vehicle device 10 is designed to put the transceiver 13b for the second radio system 220, for example, WLAN, into a ready-to-receive state, after obtaining the information about the data transmission (for example, via SMS), via the one or multiple interfaces 12. It may then subsequently be checked whether data transmission services are available via the second radio system 220. The control module 14 may then furthermore be designed to initiate the data transmission if data transmission services are available via the second radio system 220.

Figure 2:
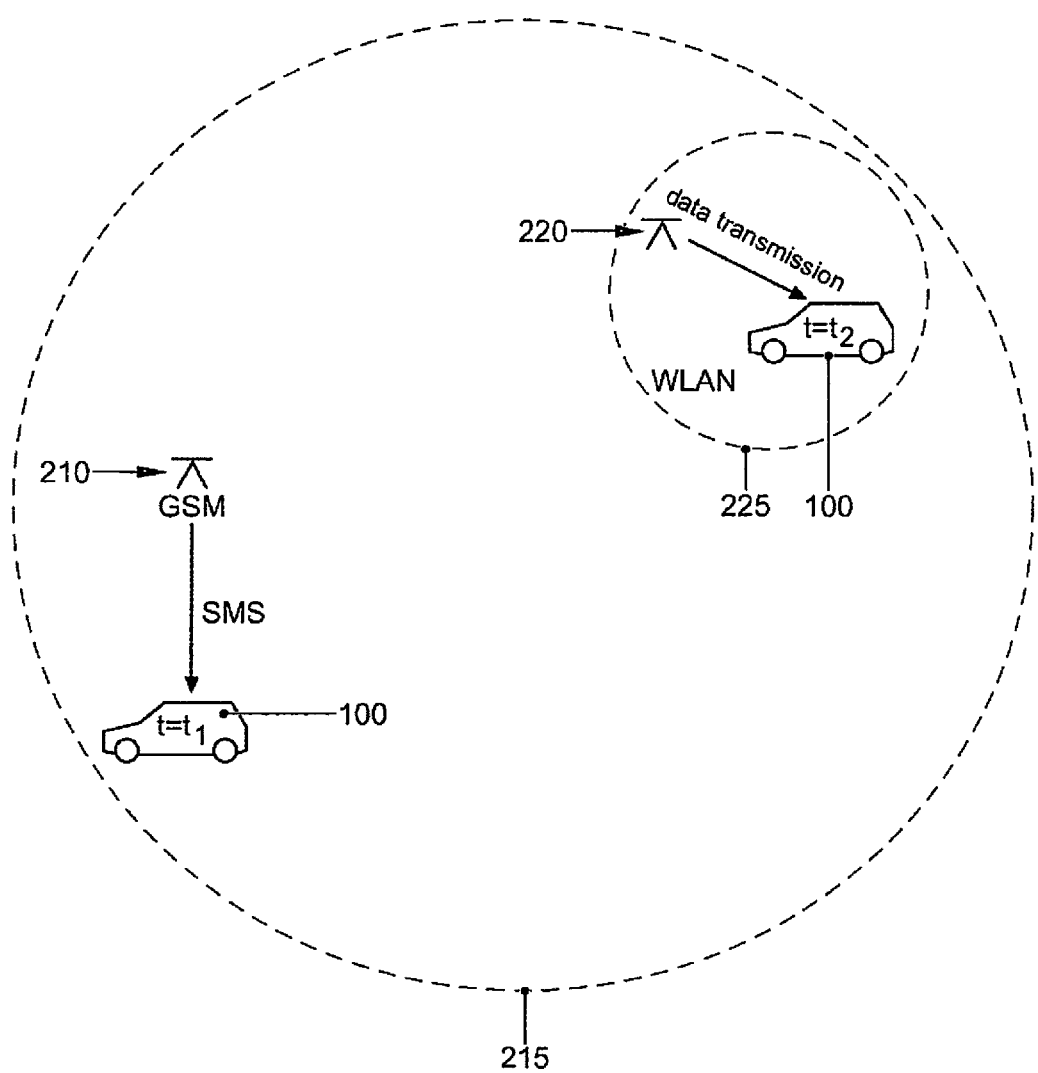
FIG. 2 shows an exemplary embodiment in a scenario outside a range of a second radio system at a first point in time and within the range of the second radio system at a second, later point in time.

If data transmission services are not available via the second radio system 220, and at least if the motor vehicle 100 is in the switched-off state, the control module 14 may furthermore be designed to put the transceiver 13b for the second radio system 220 again into the quiescent mode or into the switched-off mode via the one or multiple interfaces 12, and to check an availability of a data transmission in the second radio system 220 again at a later point in time, and to initiate the data transmission if data transmission services are available via the second radio system 220. Such an exemplary embodiment will be explained in greater detail based on FIG. 2. FIG. 2 shows a block diagram of an exemplary embodiment of a vehicle 100, which comprises an exemplary embodiment of the above-described vehicle device 10 in a scenario outside a range 225 of a second radio system 220 at a first point in time t=t1, and within the range 225 of the second radio system 220 at a second, later point in time t=t2>t1. The first radio system 210 may be assumed to be a GSM, UMTS or LTE system, while the second radio system may be assumed to be a WLAN or a HeNodeB. Furthermore, FIG. 2 illustrates that the vehicle 100 receives the SMS in the coverage area 215 of the GSM system 210, but still has no connection to the WLAN system 220. The vehicle 100 is in the coverage area 225 of the WLAN system 220 only at the later point in time, and then establishes the connection to the actual data transmission.

In some exemplary embodiments, the control module 14 may be designed to choose the later point in time based on a predefined period of time. For example, this period of time may be overnight or at certain times of day. This period of time may be predefined by a user of the vehicle and/or may be based on availabilities from the past. In this respect, the control module 14 may be designed to choose the later point in time based on a piece of availability information. In an additional exemplary embodiment, the vehicle device 10 may furthermore include a memory module 16 (see FIG. 1), wherein the control module 14 is designed to store information about a temporal and/or local availability of the data transmission in the second radio system 220 as availability information, via the memory module 16.

In at least some exemplary embodiments, the memory module may include at least one element from the group made up of computer-readable storage medium, magnetic storage medium (e.g., hard disk), flash storage medium (for example, memory card, solid-state hard disk), optical storage medium, diskette, programmable read-only memory (PROM), erasable programmable read-only memory (EPROM), electronically erasable programmable read-only memory (EEPROM), and network memory.

In this respect, the vehicle may create an availability history or an availability map of the second radio system 220 and then determine the later point in time based on this information, i.e., according to time or location.

In other exemplary embodiments, the control module 14 is designed to transmit information with respect to the status of the data transmission to the network component 200 via the first or second radio system 210, 220. The control module 24 of the network component 200 is then correspondingly designed to receive the information about the status. The network component may then check or monitor the data transmission, since the status is made known there. For example, when parking, the vehicle reports its final state and informs the back end (network component 200) whether a WLAN connection, or generally a connection to the second radio system 220, is available, and, for example, that it is switching off. The back end then knows the final state, and the process may be optimized. For example, in urgent cases, a data transmission about other, possibly more disadvantageous radio systems could then be triggered by the network component. For example, it may be reported as status information whether a piece of information about a data transmission was received; which radio systems are available, in particular, whether the second radio system is available; whether the data transmission was completed; whether an attempt to transmit data failed, for example, due to the lack of availability of the second radio system; whether a data transmission attempt is repeated; when, according to the availability history, the data transmission is anticipated; etc. Exemplary embodiments may thus enable checking or monitoring of the data transmission by the network component 200.

In this respect, exemplary embodiments may also provide coordination of use of private WLAN or other networks, in particular for the transmission of high data volumes. In this case, capacity used by this transmission may be reduced in other mobile radio networks, or resources of other networks may be conserved; costs may possibly be reduced. In addition, due to the high data rates which are possibly available in the WLAN system, transmission times may possibly be correspondingly reduced or kept at an acceptable level. As described above, the control module 14 of the vehicle device 10 may have a connection or link to a control device 110 of the vehicle 100, for example, to a control device or electronic control module (ECM). Via this link, for example, activations of individual components, for example, the particular transceivers 13a, 13b, are also possible, for example, for WLAN. A cellular system, for example, GSM, may then be used for activation. Such components may then be switched on or off as needed, for example, at the start and after the completion of a data transmission.

In addition, in exemplary embodiments, a data transmission by a user of the motor vehicle or by another network component (back end) may be initiated for various reasons, for example, for the purpose of updates, video data as needed, updating maps, etc. In some exemplary embodiments, for example, after parking and switching off the motor vehicle 100, availability of a previously configured or predetermined WLAN network may be checked, and a data transmission or a download may then optionally be initiated. Exemplary embodiments may then enable a simple establishment of a connection at the above-described later point in time. In some exemplary embodiments, the vehicle device 10 may also attempt to establish a WLAN connection at periodic intervals, for example, once per hour or every 15 minutes, 30 minutes, etc. If a connection to the WLAN or a corresponding private access point has been established, the data transmission may then begin.

Figure 3:
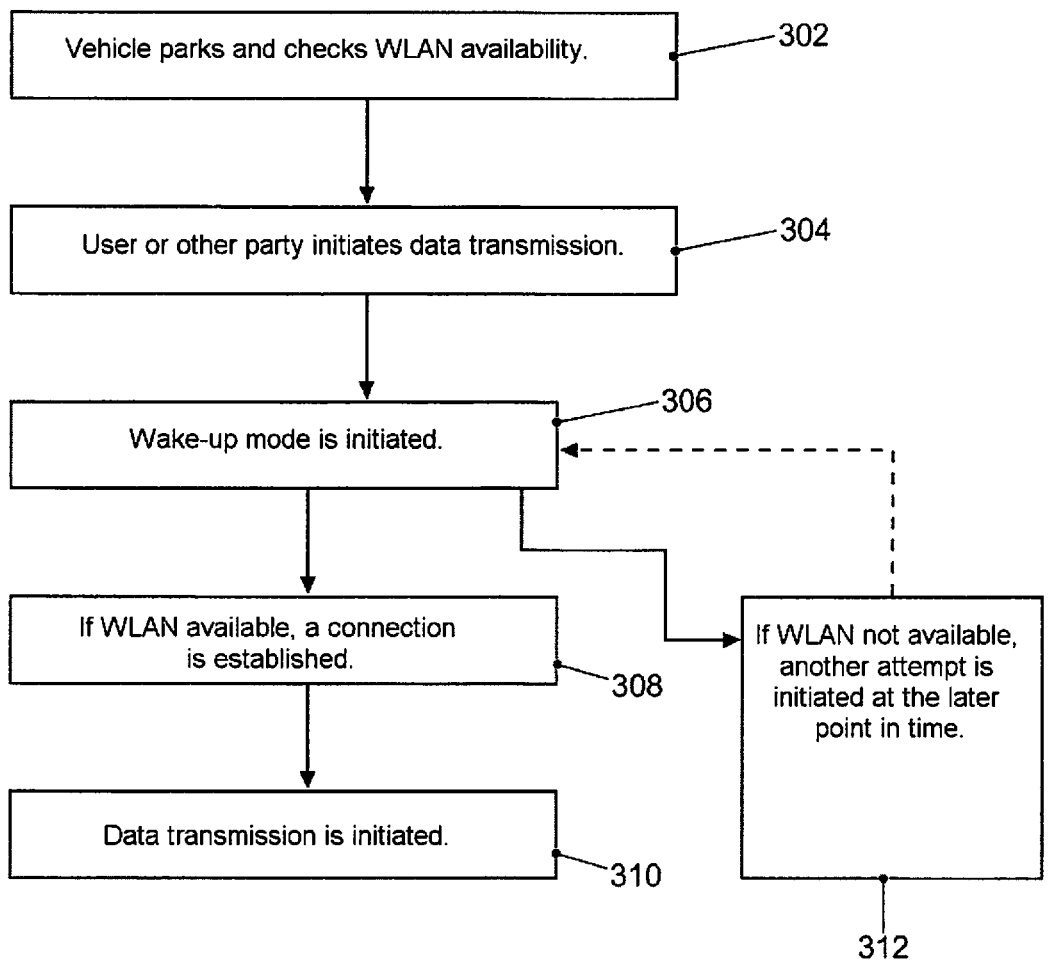
FIG. 3 shows a block diagram of an exemplary embodiment of a method for monitoring data traffic or a data transmission.

FIG. 3 shows a block diagram of an exemplary embodiment of a method for monitoring data traffic or a data transmission. In an operation at 302, the vehicle 100 is initially parked, and the availability of a WLAN system is checked. It is then assumed that a transceiver for WLAN is switched into a quiescent or standby mode, to draw as little energy as possible from the vehicle battery while parking. If a data transmission is now initiated by a user or another party (manufacturer, supplier, service provider, etc.) in an operation at 304 (for example, via SMS), a wake-up mode may be activated in a subsequent operation at 306; for example, a WLAN transceiver may be activated via a control device in the vehicle. If a WLAN is available, a connection may now be established in an operation at 308, and the data transmission may subsequently be initiated in an operation at 310. If no WLAN is available, another attempt may be carried out at a later point in time, which is depicted in FIG. 3 in an operation at 312 and a dashed arrow.

Figure 4:
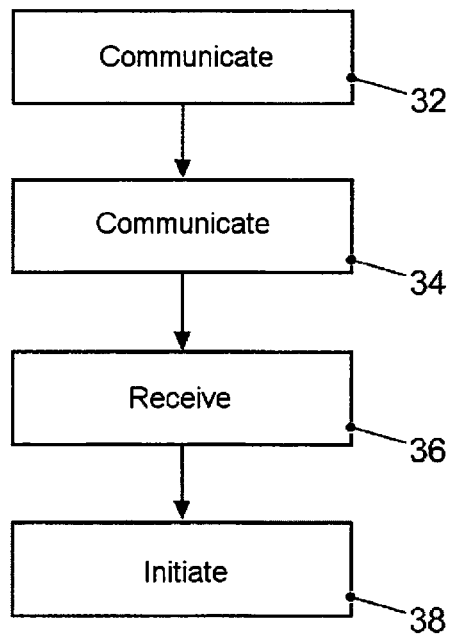
FIG. 4 shows a block diagram of an exemplary embodiment of a method for monitoring data traffic with components of a motor vehicle.

FIG. 4 shows a block diagram of an exemplary embodiment of a method for monitoring data traffic with components of a motor vehicle 100. The method includes communicating 32 with at least one transceiver 13a of a first radio system 210, and communicating 34 with at least one transceiver 13b of a second radio system 220. The method furthermore includes receiving 36 a piece of information about a data transmission via the first radio system 210, and initiating 38 the data transmission via the second radio system 220.

Figure 5:
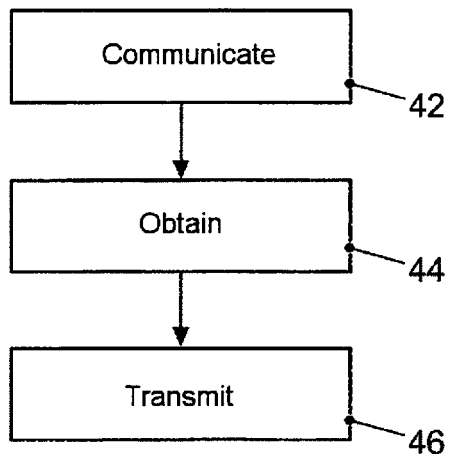
FIG. 5 shows a block diagram of an exemplary embodiment of a method for a network component.

FIG. 5 shows a block diagram of an exemplary embodiment of the method for a network component 200 for monitoring a data transmission to at least one component of a motor vehicle 100. The method comprises communicating 42 with another network component and obtaining 44 information about a request for a data transmission to a motor vehicle 100. The method furthermore comprises transmitting 46 a piece of information about the request to the motor vehicle 100, via a radio system 210.

An additional exemplary embodiment is a program for carrying out at least one of the above-described methods, if the computer program runs on a computer, a processor, or a programmable hardware component. An additional exemplary embodiment is also a digital storage medium which is machine-readable or computer-readable, and which has electronically readable control signals which are able to interact with a programmable hardware component in such a way that one of the above-described methods is executed.

The features disclosed in the above description, the following claims, and the attached figures may be relevant and may be implemented in their various embodiments both individually as well as in any arbitrary combination for carrying out an exemplary embodiment.

Although some embodiments have been described with respect to a device, it is to be understood that these embodiments also constitute a description of the corresponding method, so that a block or a structural component of a device may also be understood to be a corresponding method operation or a feature of a method operation. Similarly, embodiments which have been described with respect to a method operation or as a method operation also represent a description of a corresponding block or detail or feature of a corresponding device.

Depending on particular implementation requirements, exemplary embodiments may be implemented in hardware or in software. The implementation may be carried out using a digital storage medium, for example, a floppy disk, a DVD, a Blu-Ray disc, a CD, a ROM, a PROM, an EPROM, an EEPROM, or a FLASH memory, a hard disk, or another magnetic or optical memory on which electronically readable control signals are stored which are able to interact or which interact with programmable hardware components in such a way that the particular method is carried out.

A programmable hardware component may be formed via a processor, a central processing unit (CPU), a graphics processing unit (GPU), a computer, a computer system, an application-specific integrated circuit (ASIC), an integrated circuit (IC), a system on chip (SOC), a programmable logic element, or a field-programmable gate array (FPGA) including a microprocessor.

The digital storage medium may therefore be machine-readable or computer-readable. Some exemplary embodiments thus include a data carrier which has electronically readable control signals which are capable of interacting with a programmable computer system or a programmable hardware component in such a way that one of the methods described herein is carried out. At least one exemplary embodiment is thus a data carrier (or a digital storage medium or a computer-readable medium) on which the program is stored for carrying out one of the methods described herein.

Generally, exemplary embodiments may be implemented as a program, firmware, a computer program, or a computer program product including program code, or as data, wherein the program code or the data is/are effective for carrying out one of the methods if the program runs on a processor or a programmable hardware component. The program code or the data may, for example, also be stored on a machine-readable carrier or data carrier. Among other things, the program code or the data may exist as source code, machine code, or byte code, as well as other intermediate code.

Furthermore, an additional exemplary embodiment is a data stream, a signal sequence, or a sequence of signals, which constitute(s) the program for carrying out one of the methods described herein. The data stream, the signal sequence, or the sequence of signals may, for example, be configured to be transferred via a data communication connection, for example, via the Internet or another network. Exemplary embodiments are thus also signal sequences representing data, which are suitable for transmission via a network or a data communication connection, wherein the data constitute the program.

A program according to at least one exemplary embodiment may implement one of the methods during its execution, for example, by reading out these storage areas or writing a piece of data or multiple pieces of data into them, whereby switching operations or other operations are possibly generated in transistor structures, in amplifier structures, or in other electrical, optical, or magnetic components, or components operating according to another functional principle. Accordingly, data, values, sensor values, or other information may be recorded, determined, or measured by a program, by reading out a memory location. A program may therefore record, determine or measure variables, values, measured variables and other information by reading out one or multiple memory areas, and effect, initiate, or carry out an action by writing into one or multiple storage areas, and control other devices, machines, and components.

The above-described exemplary embodiments constitute merely an illustration of the principles. It is to be understood that modifications and variations of the arrangements and details described herein will be clear to others skilled in the art. Therefore, it is intended that the embodiments are to be limited only by the scope of protection of the patent claims below, not by the specific details which have been presented herein based on the description and the explanation of the exemplary embodiments.

LIST OF REFERENCE NUMERALS

10 Vehicle device
12 One or multiple interfaces
13a, b Transceiver
14 Control module
16 Memory module
18 Energy store
20 Network device
22 At least one interface
24 Control module
32 Communicating
34 Communicating
36 Receiving
38 Initiating
42 Communicating
44 Obtaining
46 Transferring
100 Motor vehicle
110 Control device
200 Network component
210 First radio system
215 Coverage area of first radio system
220 Second radio system
225 Coverage area of second radio system
302 Parking and availability check
304 Initiation of data transmission
306 Wake-up mode
308 Establishment of connection if available
310 Data transmission
312 Repetition attempt

The invention claimed is:

1. An on-vehicle device for monitoring data traffic with components of a transportation vehicle, the on-vehicle device comprising:
    an interface configured to communicate with a transceiver of a first radio system and with a transceiver of a second radio system;
    a memory module; and
    a control module configured to receive a piece of information about a data transmission via the interface and the first radio system, and to initiate the data transmission via the second radio system,
    wherein the control module stores historical information about temporal and/or geographical availability of the data transmission in the second radio system as availability information in the memory module, and identifies an availability to receive the data transmission via the second radio system based on the stored availability information,
    wherein the control module transmits information with respect to the status of the data transmission to a network component, via the first or second radio system, upon placing the motor vehicle in a parked state.

2. The on-vehicle device of claim 1, wherein the one or multiple interfaces communicate with a control device of the transportation vehicle, wherein the control module transmits transmitted data to the control device of the vehicle.

3. The on-vehicle device of claim 1, wherein, in a switched-off state of the transportation vehicle, the control module puts the transceivers into a ready-to-receive state with respect to the first radio system, and puts the transceivers into a quiescent mode or a switched-off mode with respect to the second radio system, via the one or multiple interfaces.

4. The on-vehicle device of claim 3, wherein the control module monitors a charge state of an energy store in the switched-off state of the transportation vehicle, and puts the transceivers into a ready-to-receive state via the one or multiple interfaces, in response to a minimum charge being present in the energy store.

5. The on-vehicle device of claim 1, wherein the control module receives the information about the data transmission as a short message via the first radio system.

6. The on-vehicle device of claim 1, wherein the first radio system corresponds to a Global System for Mobile Communication, and/or wherein the second radio system corresponds to a Wireless Local Area Network.

7. The on-vehicle device of claim 1, wherein the data transmission includes a transmission of update data for a component of the transportation vehicle, media data for a media playback system of the transportation vehicle, or control data of a manufacturer of the transportation vehicle or of a manufacturer of transportation vehicle components.

8. The on-vehicle device of claim 1, wherein, after obtaining the information about the data transmission, the control module puts the transceiver for the second radio system into a ready-to-receive state via the one or multiple interfaces, to check whether data transmission services are available via the second radio system, and to initiate the data transmission in response to data transmission services being available via the second radio system.

9. The on-vehicle device of claim 8, wherein, in response to data transmission services not being available via the second radio system, and at least in response to the transportation vehicle being in the switched-off state, the control module puts the transceiver for the second radio system again into the quiescent mode or the switched-off state via the one or multiple interfaces, and checks an availability of a data transmission in the second radio system again at a later point in time, and initiates the data transmission in response to data transmission services being available via the second radio system.

10. The on-vehicle device of claim 9, wherein the control module chooses the later point in time based on the predefined period of time, and/or wherein the control module chooses the later point in time based on a piece of availability information.

11. The on-vehicle device of claim 1, wherein the information with respect to the status of the data transmission includes at least one of:
whether a piece of information about a data transmission was received;
whether the second radio system is available to initiate the data transmission;
whether the data transmission was completed;
whether an attempt to transmit data failed;
whether an attempt to initiate the data transmission is repeated; and
when, according to the availability history, the data transmission is anticipated.

12. A transportation vehicle comprising an on-vehicle device for monitoring data traffic with components of the transportation vehicle, the on-vehicle device comprising:
an interface configured to communicate with a transceiver of a first radio system and with a transceiver of a second radio system;
a memory module; and
a control module configured to receive a piece of information about a data transmission via the interface and the first radio system, and to initiate the data transmission via the second radio system,
wherein the control module stores historical information about temporal and/or geographical availability of the data transmission in the second radio system as availability information in the memory module, and identifies an availability to receive the data transmission via the second radio system based on the stored availability information,
wherein the control module transmits information with respect to the status of the data transmission to a network component, via the first or second radio system, upon placing the transportation vehicle in a parked state.

13. The vehicle of claim 12, wherein the information with respect to the status of the data transmission includes at least one of:
whether a piece of information about a data transmission was received;
whether the second radio system is available to initiate the data transmission;
whether the data transmission was completed;
whether an attempt to transmit data failed;
whether an attempt to initiate the data transmission is repeated; and
when, according to the availability history, the data transmission is anticipated.

14. A device for a network component for monitoring a data transmission to at least one component of a transportation vehicle, the device comprising:
at least one interface to communicate with at least one other network component;
a memory module; and
a control module to obtain information about a request for a data transmission to the motor vehicle via the at least one interface, and to transmit a transmission of a piece of information about the request to the motor vehicle via a radio system, via the at least one interface,
wherein the control module stores historical information about temporal and/or geographical availability of the data transmission in the second radio system as availability information in the memory module, and identifies an availability to receive the data transmission via the radio system based on the stored availability information,
wherein the control module transmits information with respect to the status of the data transmission to the network component, via the radio system, upon placing the transportation vehicle in a parked state.

15. The device of claim 14, wherein the control module transmits the information about the request for the data transmission as a short message via the radio system.

16. The device of claim 14, wherein the radio system corresponds to a Global System for Mobile Communication.

17. The device of claim 14, wherein the at least one interface obtains the information about the request from a user of the transportation vehicle, from a component manufacturer of the transportation vehicle, or from a manufacturer of the transportation vehicle.

18. The device of claim 14, wherein the information with respect to the status of the data transmission includes at least one of:
whether a piece of information about a data transmission was received;
whether the radio system is available to initiate the data transmission;
whether the data transmission was completed;
whether an attempt to transmit data failed;
whether an attempt to initiate the data transmission is repeated; and when, according to the availability history, the data transmission is anticipated.

19. A method for monitoring data traffic with components of a transportation vehicle in the transportation vehicle, the method comprising:
communicating with at least one transceiver of a first radio system;
communicating with at least one transceiver of a second radio system;
receiving a piece of information about a data transmission via the first radio system;
storing historical information about temporal and/or geographical availability of the data transmission in the second radio system as availability information;
identifying an availability to receive the data transmission via the second radio system based on the availability information;
initiating the data transmission via the second radio system; and
transmitting information with respect to the status of the data transmission to a network component, via the first or second radio system, upon placing the transportation vehicle in a parked state.

20. The method of claim 19, wherein the information with respect to the status of the data transmission includes at least one of:
whether a piece of information about a data transmission was received;
whether the second radio system is available to initiate the data transmission;
whether the data transmission was completed;
whether an attempt to transmit data failed;
whether an attempt to initiate the data transmission is repeated; and
when, according to the availability history, the data transmission is anticipated.

21. A computer program stored on a non-transitory computer readable medium and including program code for carrying out at least one method for monitoring data traffic with components of a transportation vehicle, when the program code is executed on a computer, a processor, a control module, or a programmable hardware component, wherein the method comprises:
communicating with at least one transceiver of a first radio system;
communicating with at least one transceiver of a second radio system;
receiving a piece of information about a data transmission via the first radio system;
storing historical information about temporal and/or geographical availability of the data transmission in the second radio system as availability information;
identifying an availability to receive the data transmission via the second radio system based on the availability information;
initiating the data transmission via the second radio system; and
transmitting information with respect to the status of the data transmission to a network component, via the first or second radio system, upon placing the transportation vehicle in a parked state.

22. The computer program of claim 21, wherein the information with respect to the status of the data transmission includes at least one of:
whether a piece of information about a data transmission was received;
whether the second radio system is available to initiate the data transmission;
whether the data transmission was completed;
whether an attempt to transmit data failed;
whether an attempt to initiate the data transmission is repeated; and
when, according to the availability history, the data transmission is anticipated.

* * * * *